March 17, 1964  W. H. TAYLOR  3,125,089
SPACE HEATER AND COOLER
Filed March 30, 1953  8 Sheets-Sheet 1

INVENTOR.
WILLIAM H. TAYLOR
BY
Wheeler, Wheeler & Wheeler
ATTORNEYS

March 17, 1964  W. H. TAYLOR  3,125,089
SPACE HEATER AND COOLER
Filed March 30, 1953  8 Sheets-Sheet 7

INVENTOR.
WILLIAM H. TAYLOR

Wheeler, Wheeler & Wheeler
ATTORNEYS

March 17, 1964 — W. H. TAYLOR — 3,125,089
SPACE HEATER AND COOLER
Filed March 30, 1953 — 8 Sheets-Sheet 8

INVENTOR.
WILLIAM H. TAYLOR
BY
Wheeler, Wheeler & Wheeler
ATTORNEYS

United States Patent Office 3,125,089
Patented Mar. 17, 1964

3,125,089
SPACE HEATER AND COOLER
William H. Taylor, 1372 E. 52nd St., Chicago, Ill.
Filed Mar. 30, 1953, Ser. No. 345,429
45 Claims. (Cl. 126—110)

This invention relates to a space heater and cooler with a single rotor having vanes at both sides of a heat exchange element through which the rotor passes.

The invention seeks to provide a heat exchange device of exceptional efficiency using a minimum number of moving parts, the single rotor having gas propelling radial vanes on opposite sides of a heat exchange partition, bowl shaped for strength and efficiency. In some embodiments the same device may be used either for heating or cooling. In other embodiments, the heater and cooler are interchangeable in the same cabinet.

The rotor of the heater also carries a fuel channel in which various liquid, gaseous, and even pulverized solid fuels distribute themselves and from the rim of which the burning fuel issues. Combustion is substantially completed before the flue gases issue from the device, having given up their heat during scouring movement across the bowl shaped heat exchange partition. It is an important feature of the invention that the device is adapted to handle a wide variety of fuels without any change or even major adjustment. It will operate successfully on illuminating gas, gasoline, kerosene, and fuel oil, and even powdered coal.

Leakage of flue gas into the space to be heated is precluded by a special bearing arrangement whereby the rotary joints between the rotor and stationary parts of the apparatus are either located in zones wherein the flue gas is at subatmospheric pressure, or are so located that leakage will be returned to the combustion chamber.

Air heated and discharged from the main heat exchange surface aspirates other air through the cabinet for cooling those portions of the rotor which are exposed to the products of combustion and for preventing overheating of any portions of the apparatus and for delivering all excess heat into the air of the space to be heated. Because of the fact that the flue gas is discharged under pressure, only a minimum capacity of flue pipe is required to vent such gas.

A specially devised pump not only facilitates accurate control of fuel to maintain desired temperatures without starting and stopping the heater, but may also be used to cause circlation in an ancillary system which conveys heat from the flue gases and uses it in radiators outside of the space heater. In particular cases, where the heater is to be used in the arctic or other extremely cold locations, this otherwise wasted heat may be used to maintain the fuel liquid so that it may readily be pumped to the heater.

In order that the device may be used to handle a wide variety of fuels without such flash as would extinguish the flame where the fuels are extremely volatile, a special fuel controlling arrangement is used for delivering into the combustion chamber, uniformly at the rate determined by the pump, the fuel arriving from the pump, this being accomplished by a special screw in the feed tube which, in practice, comprises a piano wire helix intermittently rotated by the same means used to actuate the pump.

All parts of the apparatus are operated from a single motor which actuates the rotor, the pump, and the feed screw aforesaid at a constant speed, pump capacity being varied as desired by controlling the displacement of the pump diaphragm. Anything which interferes with the continuous operation of the motor shuts down the entire apparatus, since the fuel is not fed by gravity but by pump displacement. For safety, I have provided a single control which permits the motor to operate only when the combustion chamber is within a pre-determined temperature range. If the regulating thermostat either exceeds or drops below the requisite temperature range, it will release, in either case, the detent which holds the motor switch closed, thereby allowing that switch to spring open. The detent and the thermostat have parts operatively engageable only within the range, the interlocking thermostat part being movable in either direction out of engagement with the complementary part of the detent. Means is provided whereby the switch may be held shut by manual actuation of the detent until the combustion chamber reaches a temperature within the operating range, a special starting reservoir being provided for sufficient fuel to raise the temperature to that point.

Figure 5:
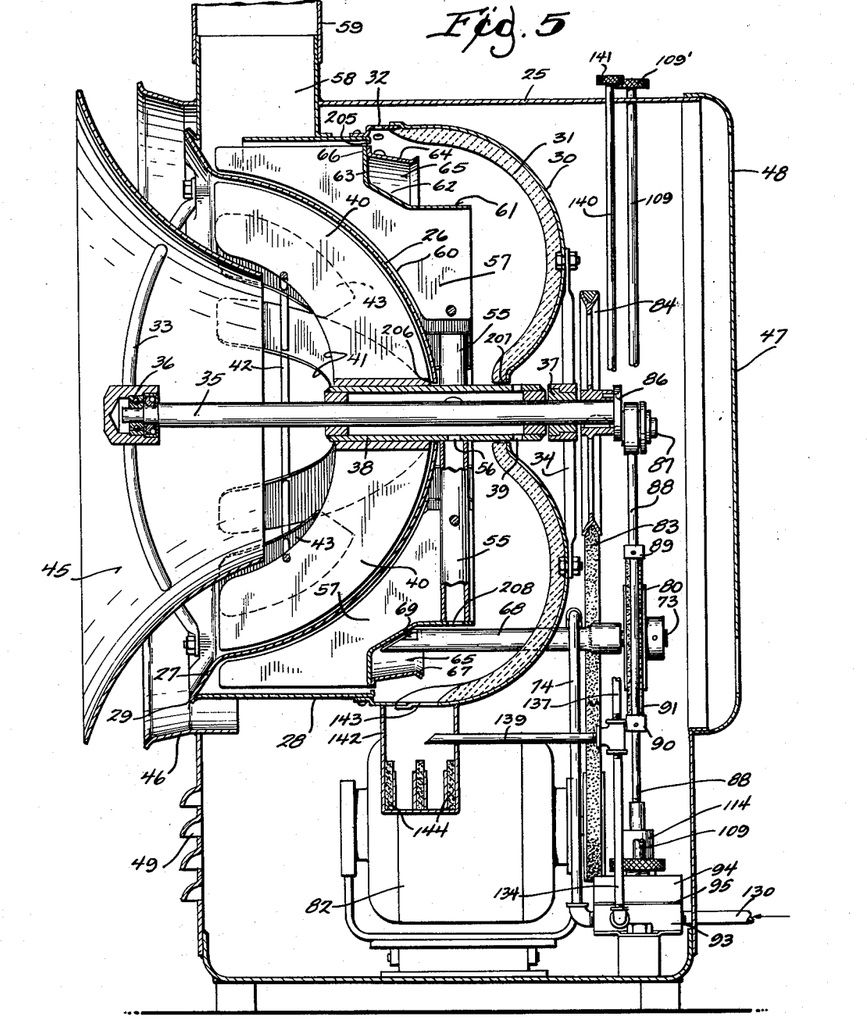
FIG. 5 is a view taken on an enlarged scale on the line 5—5 of FIG. 4, being generally on an axial section except that the pump and other parts ahead of such section are shown in elevation.

Within the cabinet 25 I mount the bowl shaped heat exchange partition 26, the concave surface of which is exposed to the air of the space to be heated. The partition desirably has a flaring rim at 27 to which the generally cylindrical wall 28 of the combustion chamber has a tightly sealed connection at 29 (FIG. 5). Attached to the generally sealed wall 28, and disposed therebehind, is the radially concave fire pot 30, desirably having a lining 31 of fire clay or other ceramic material, between which and the wall 28, the fire pot has an annular series of air admission ports in wall 32.

A forward spider 33 and a rearward spider 34 provide suitable bearings within which rotor shaft 35 is rotatably mounted. By preference I use a forward ball bearing at 36 and a sleeve bearing or bushing at 37 for the rear end of the shaft. Mounted on the shaft is a sleeve 38 having air admission ports 39 behind the fire pot 30 to receive external air, which is used to cool those portions of the rotor which operate in the combustion chamber.

Figure 1:
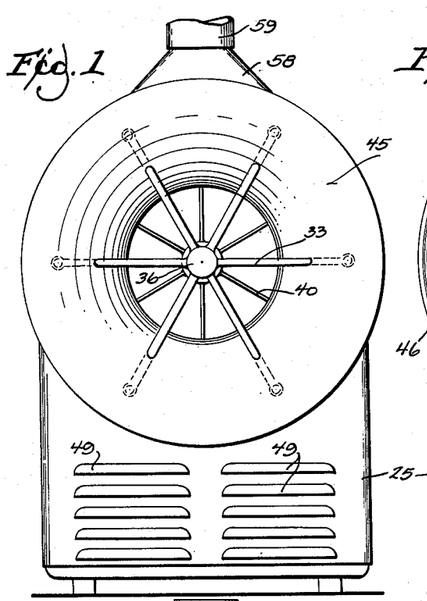
FIG. 1 is a view in front elevation of the space heater embodying the invention.
Figure 2:
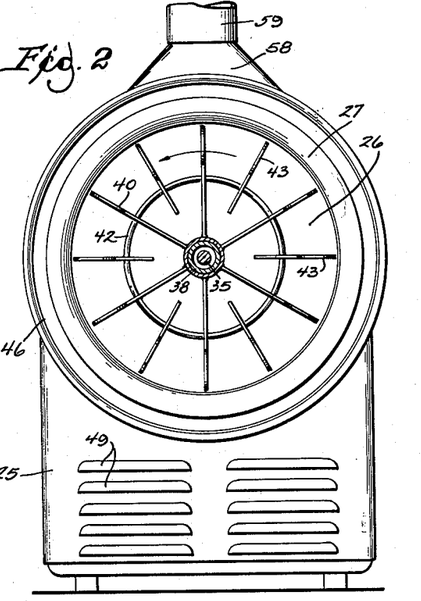
FIG. 2 is a view similar to FIG. 1 showing the space heater as it appears when an air guiding baffle has been removed from the front thereof.

Forwardly of the heat exchange partition 26, the sleeve shaft 38 carries a number of radial vanes 40, each of which has an arcuate rear margin in close proximity to and arcuate conformity with the concave face of the heat exchange partition 26. The inner margins 41 of the vanes 40 are also concave and are connected, for support, by a ring 42, upon which auxiliary vanes 43 may be mounted as best shown in FIGS. 2 and 5.

Air will enter axially of the bowl shaped partition and be expelled centrifugally from its perimeter during actuation of the rotor. To guide the air and reduce eddy currents, I may mount upon spider 33 the bell shaped or flaring baffle 45, best shown in FIG. 5.

Figure 4:
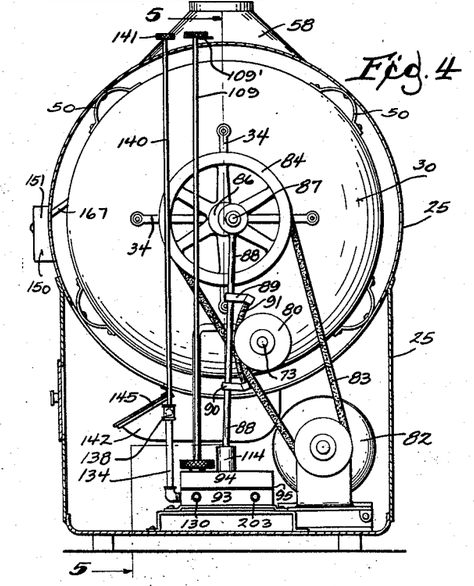
FIG. 4 is a view of the device in rear elevation, with its rear cover removed.

I also prefer to use at 46 a flaring annular baffle opening from the cabinet in a position such as to be wiped by the air thrown from the flaring rim 27 of the heat exchange partition 26, the arrangement being such that the hot air ejected from the heat exchange partition will aspirate air from within the cabinet to increase total air movement, temper the air heated by contact with the partition, and cool the interior of the cabinet and the parts therein by causing circulation through the cabinet. The rear cover 47 has a plurality of air admission ports at 48 and additional air is admitted through the louvers 49 in the lower front wall. The air thus drawn through the cabinet passes over the brackets 50 which support the space heater proper from the cabinet as best shown in FIG. 4, thereby cooling such brackets. The air also passes over the external surfaces of the fire pot 30 and the combustion chamber wall 28 to prevent these parts from becoming unduly hot.

Figure 3:
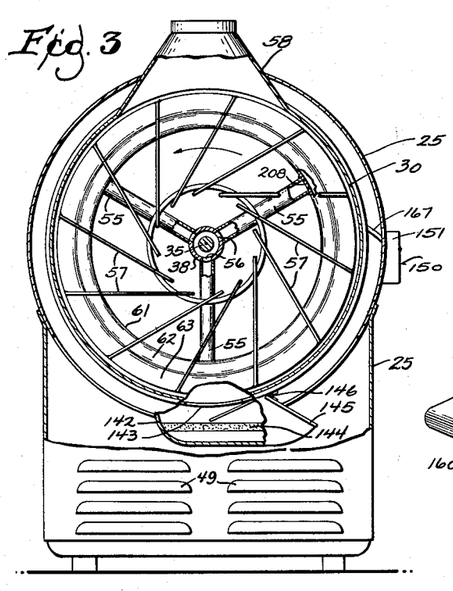
FIG. 3 is another view of the device as it appears from the front with the heat exchange partition and all parts at the front thereof removed to expose that portion of the rotor which circulates flue gas behind the partition, parts of the rotor being broken away.

The rotor sleeve shaft 38 is provided behind the heat transfer partition 26 with tubular arms 55 communicating through ports 56 (FIGS. 3 and 5) with the interior of sleeve 38 to receive cooling air admitted to such sleeve through the ports 39 (FIG. 5). Arms 55 support a series of vanes 57 which are not truly radial as they appear to be in FIG. 5 but desirably have a rearward rake as shown in FIG. 3 to have a pronounced effect tending to accelerate the regular flow of air toward the outside of the combustion chamber to be received into the boot 58 from which the flue pipe 59 opens.

Figure 8:
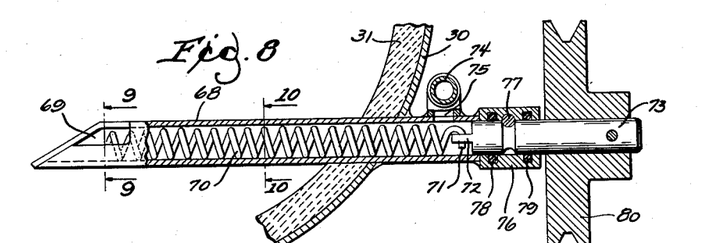
FIG. 8 is a view on a greatly enlarged scale showing in axial section a detail of the screw for rendering constant the flow of fuel into the combustion chamber.
Figures 9, 10, 22, 23:
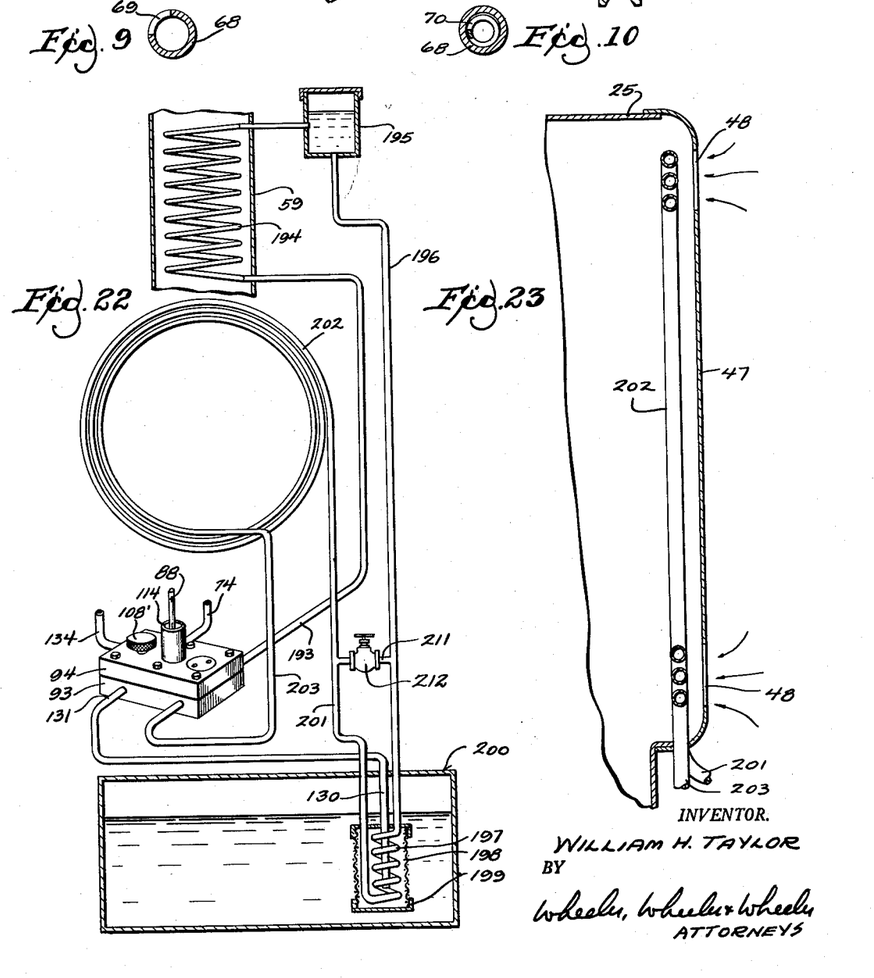
FIG. 9 is a detailed view taken on the line 9—9 of FIG. 8.
FIG. 10 is a detailed view taken on the line 10—10 of FIG. 8.
FIG. 22 is a diagrammatic view partially in section and partially in perspective showing the pump operated circulatory heat exchange system for salvaging flue gas heat.
FIG. 23 is a detailed view in vertical section through a portion of the space heater housing showing a modified embodiment wherein a portion of such heat may optionally be dissipated.

The inner edges 60 of vanes 57 are arcuately concave in close conformity with the convex rear face of the heat exchange partition 26, as clearly shown in FIG. 5. At their opposite margins the vanes are notched to receive a ring 61 which not only connects the vanes to provide a rigid vane structure but also forms the inner wall 62, and the annular bottom 63 of a fuel trough which is completed by an outer wall 64. The trough is designated by reference character 65. It will be noted that the wall 64 is not cylindrical but is somewhat frusto-conical, its rear free margin being smaller in diameter than the front marginal flange 66 at which it connects to wall 63. At its free rear margin, the wall 64 of the fuel trough 65 has a flaring rim 67 over which the fuel delivered into the trough is discharged during operation. The fuel supplied to the trough enters through the fuel supply pipe 68. As shown in FIGS. 8 and 9, the pipe 68 is closed at its end except for a lateral discharge notch at 69 which delivers into the trough 65 in direction of rotation thereof fuel which accumulates in tube 68 to a depth sufficient to flow from the notch. If the fuel is gaseous, or if it is vaporized and expanded by the heat, its direction of delivery will be tangential along the trough instead of impacting the back wall of the trough to bounce back outwardly thereof.

As shown in FIGS. 5 and 8, this pipe will handle all liquid and gaseous fuels sufficiently fluid to flow therethrough and it will also handle powdered fuel, although powdered fuel should desirably be supplied to the pipe by some means other than the pump which is hereinafter described as a means for delivering and measuring the flow of fluid fuels, liquid or gaseous.

For non-volatile fuels, such as heavy oil, the pipe 68 may be wide open and unobstructed. I have found, however, that in order to make the device adaptable to all fuels, it is desirable to have within the pipe a helical feed screw 70. The best construction known to me is to use for this purpose a helical piano wire spring loosely fitted within the pipe as shown in FIG. 8 and provided at its inner end with a hook 71 engaged in the apertured ear 72 of a driving shaft 73. The fuel arrives through tube 74 which communicates through port 75 in the side wall of the pipe with the interior of the pipe. The shaft 73 is rotatable in a bearing at 76 wherein it is keyed by cross pin 77. Leakage is prevented by packing at 78 and 79. The rate of operation of the screw 70 should be proportioned in general to the rate of operation of the fuel pump. To that end, shaft 73 is provided with a pulley at 80 which I find it convenient to operate in the manner shown in FIG. 4.

Figure 7:
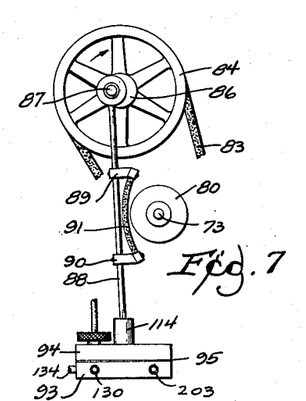
FIG. 7 is a fragmentary detailed view similar to FIG. 4 but limited to the means whereby the pump operating pitman actuates the fuel feed screw shown in FIG. 8.

The entire rotor as above described, including shaft 35 and the several vanes mounted thereon, as well as the fuel trough above described, is actuated from a motor 82 by means of a belt 83 operating over a pulley 84 on shaft 35. At the outer end of the shaft, or on the hub of the pulley is a crank disk 86 from which projects a crank pin 87 (FIG. 5) connected with a pitman 88 for operating the pump hereinafter to be described. Pitman 88 has a pair of laterally projecting arms at 89 and 90 between which I connect somewhat loosely a piece of V-belt 91 which, in each oscillation of the pitman 88 will first disengage itself from pulley 80, as shown in FIG. 7, this being in the course of upward oscillation of the pitman 88, and will then engage itself with pulley 80 on the downward stroke of pitman 88 to oscillate pulley 80 in a counterclockwise direction as viewed in FIG. 4 to effect intermittent rotary movement of the feed screw 70 in the fuel pipe 68 in a fuel feeding direction for delivering fuel toward the point of discharge from the end of such pipe into the fuel trough 64.

The rotating helix of wire positively propels through the tube 63 any sludge or solids which might otherwise accumulate therein. In addition, this helix effects centrifugal separation of vapor from liquids, by causing a vortex rotation of any material tending to pass rapidly through the feed tube 68, whereby the liquid component will be centrifugally thrown out to the periphery and will pass between the turns of the helix, leaving the center of the tube open to permit the escape of the vapor. But for this unique feature, gas bubbles forming in the tube would eject all of the fuel component ahead of them to cause erratic burning. With the open helix rotated by power as shown, the flow of all fuel is sufficiently regular so that the heater operates smoothly.

When the motor 82 is in operation, the fuel (gaseous or liquid) is fed and metered by a diaphragm displacement pump illustrated in FIGS. 15 to 21.

Figure 17:
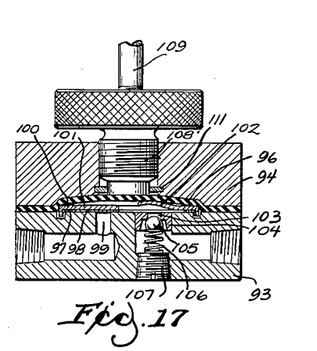
FIG. 17 is a view of the pump in transverse section on the line 17—17 of FIG. 15.
Figure 18:
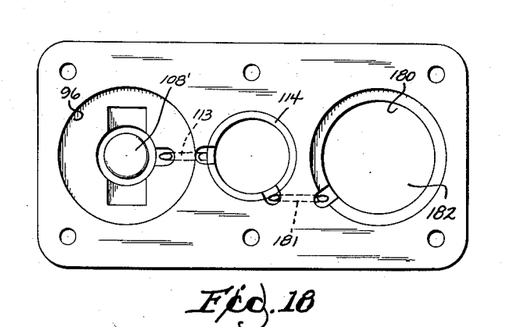
FIG. 18 is an inverted plan view of the pump cover.

The pump comprises two blocks 93 and 94 between which there is clamped a gasket and diaphragm web 95 substantially co-extensive with the blocks. The blocks are so formed as to provide cavities within which portions of the diaphragm web 95 may be displaced. One such cavity at 96 in the lower face of the upper block 94 accommodates an upwardly displaced portion of the diaphragm beneath which is a ring 97 (FIG. 21) having a tab at 98 projecting inwardly toward its center and constituting a leaf valve which overlies the inlet port 99. A similar and registering ring 100 is superimposed on the ring 97 and has an inwardly projecting tab 101 overlying the valve tab 98 and serving as a spring which biases the valve tab 98 toward its seat on the upper face of the block 93. Ring 100 is provided with another tab at 102 which is diametrically opposite the tab 101 and is arched upwardly, as best shown in FIG. 17, over the outlet port 103 which is provided in a seat insert 104 and normally closed by a ball check valve 105 urged upwardly to its seat by the compression spring 106 resting on plug 107.

Opening upwardly above the center of the recess 96 is a bore 108 in which the plug 108' is threaded for manual adjustment. To facilitate such adjustment, the plug has a knurled head from which a control rod 109 leads upwardly to a handle 109' at the top of the cabinet (see FIG. 4). The purpose of the adjustment is to position the stop member 110, which is carried by the plug 108', in the path of upward expansion of the diaphragm to limit diaphragm movement and thereby to define the displacement of the pump in each stroke. A packing ring 111 positioned in a channel in block 94 peripherally surrounds the stop member 110 to provide a seal.

Figure 19:
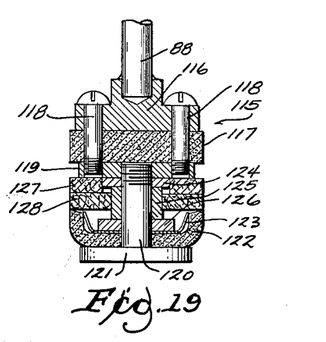
FIG. 19 is an enlarged detailed view of the operating pump plunger in axial section.
Figure 20:
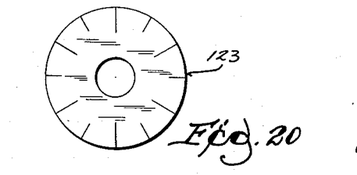
FIG. 20 is an enlarged detailed view in plan of the cup washer spring of the plunger shown in FIG. 19.
Figure 21:
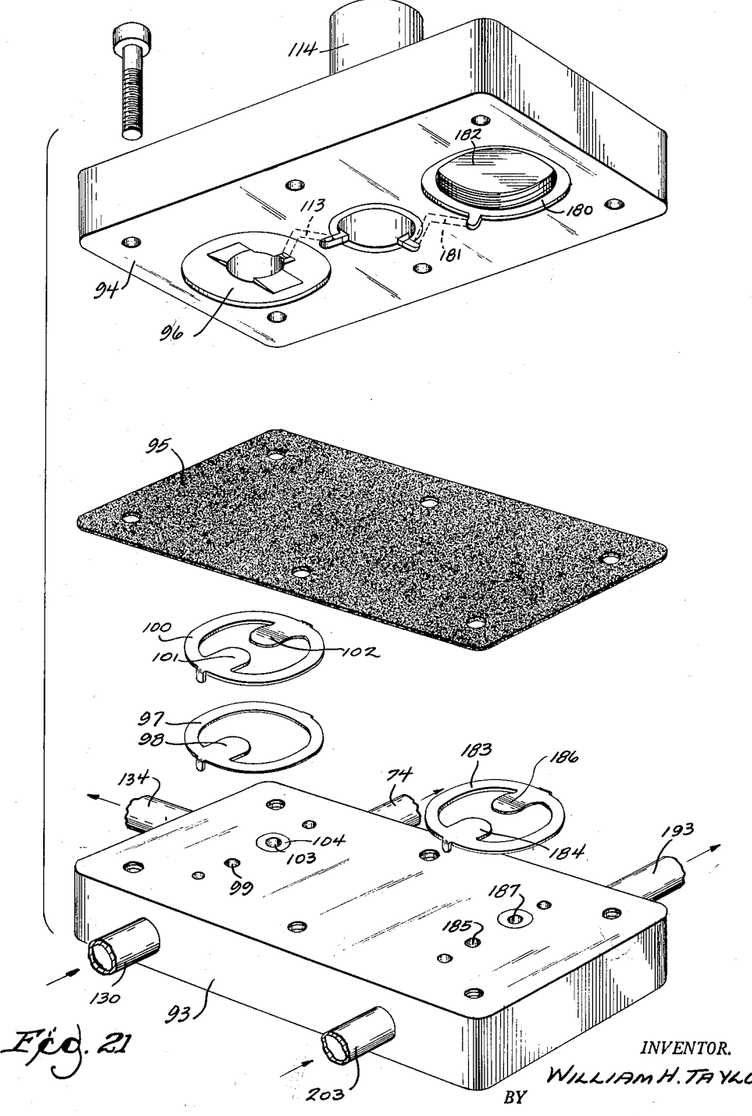
FIG. 21 is an enlarged view in exploded perspective of the component parts of the pump shown in FIGS. 15 to 20.

The diaphragm is made to reciprocate in recess 96 for fuel displacement purposes by fluid pressure communicated to the recess 96 above the displacement by duct 113 (FIG. 15), which places such recess in communication with the interior of a cylinder 114 in which the plunger generically designated by reference character 115 is reciprocable by means of the crank operated pitman 88 to which reference has been made above (FIGS. 4 and 5). The preferred construction of the plunger is illustrated in FIG. 19. A head 116 carried by the pitman has a pump-leather disk 117 clamped to it by bolts 118 which are threaded into a common nut at 119. Centrally in this nut is threaded a depending bolt 120, the head 121 of which supports a cup leather 122 expanded outwardly by a spring 123 of the form illustrated in FIG. 20, which may be made of beryllium copper or the like. Spacers 124, 125 and 126 on the bolt 120 between nut 119 and the spring enables the bolt 120 to clamp the spring and cup leather against the lowermost spacer 126. Surrounding spacers 124 and 125 are gaskets 127 and 128 which may be made of felt or the like.

Figure 6:
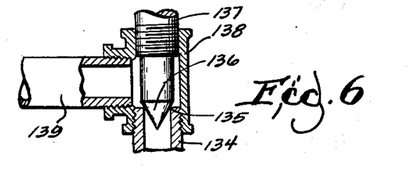
FIG. 6 is a fragmentary detailed view on an enlarged scale showing the valve which admits fuel to the starting reservoir.
Figure 15:
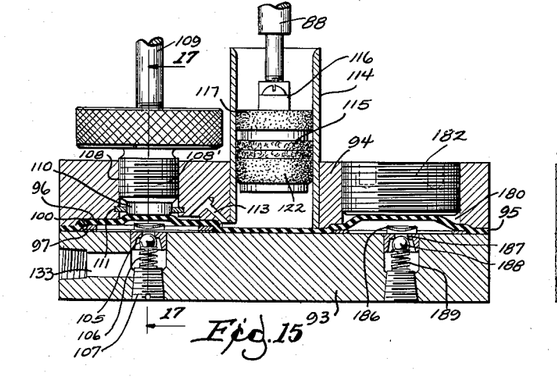
FIG. 15 is a view of the special fuel and circulating pump shown in section on line 15—15 of FIG. 16.
Figure 16:
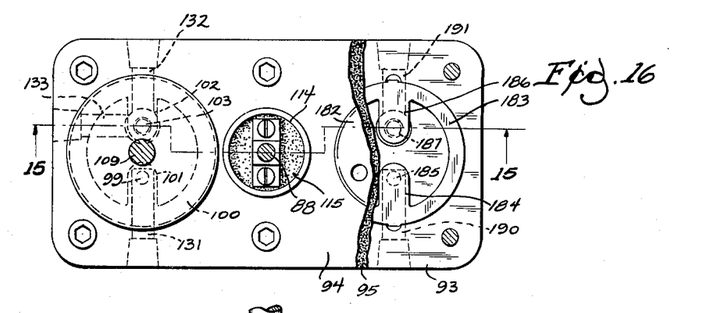
FIG. 16 is a plan view of the pump with portions broken away.

The plunger 115 is operated with a constant stroke determined by the radius of crank 87 which actuates the piston 88, this stroke being adequate to operate the diaphragm 95 through the maximum required displacement. In order to control the amount of fuel displaced, regardless of the fact that the plunger stroke is constant, it is only necessary to adjust the stop member 110 by rotating plug 108', whereby to arrest the upward movement of the diaphragm when its upper surface is subjected to vacuum by withdrawal of the plunger. This limits the amount of fuel which will be drawn through the inlet port 99, and which will later be discharged through the outlet port 103 when the plunger 115 moves downwardly to subject the upper surface of the diaphragm to pressure. The fuel arrives from any suitable tank through pipe 130 (FIG. 5), which communicates with the pump inlet duct 131 (FIG. 16). There are two outlet ducts beyond check valve 105, as shown in FIGS. 15 to 17. One of these at 132 is directly opposite the inlet duct 131 and from it opens the pipe 74 which leads to the fuel conduit 68 above described (FIG. 8). The other fuel delivery port 133 leads to pipe 134 which has at its upper end a seat at 135 controlled by valve 136, the stem portion 137 of which is threaded in a valve casing 138 from which pipe 139 opens laterally (FIG. 6). The valve stem 137 is actuated by control rod 140 having handle 141 at its upper end, at the top of the cabinet (FIG. 5).

Fuel discharged from pipe 139 when valve 136 is open is delivered into a starting reservoir at 142 which opens upwardly into the combustion chamber as best shown in FIGS. 3 and 5 at 143. This chamber is desirably provided with one or more wicks 144 of asbestos or glass fiber or the like. It is desirably provided with a trap door 145 hinged at 146 to be self-closing under gravity bias. Through this door the fuel admitted to the starting reservoir 142 may be ignited, and its combustion in this chamber will develop sufficient heat in the main combustion chamber to initiate the proper operation of the apparatus and to raise the temperature sufficiently so that the thermostatically controlled detent hereinafter to be described will maintain the motor 82 in operation. Valve 136 is normally closed and is manually opened only for such period as is necessary to permit the manually regulated operation of the motor to deliver into reservoir 142 sufficient fuel for starting purposes. Valve 136 will then be closed by handle 141 before the fuel is ignited.

Operation of the motor 82 is controlled by the normally open switch generically designated by reference character 150 and shown in FIGS. 11 to 14. Within the casing 151 is a dielectric block 152 which supports the terminals 153, 154, which are connected in series with the motor. Anchored beneath terminal 153 is one end of contact spring 155, the free end portion 156 of which is normally inclined upwardly in the position shown in FIG. 13 so that the contact 157 carried by the spring is normally disengaged from the contact 158 fixed to terminal 154.

Figures 11, 12:
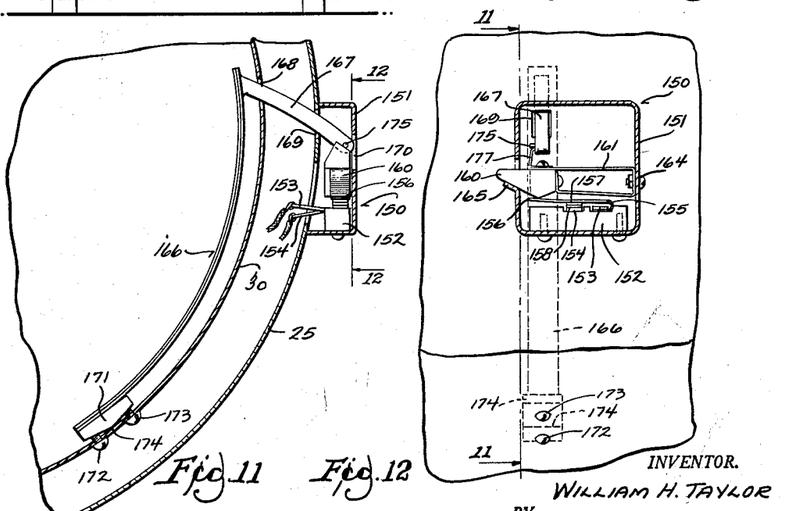
FIG. 11 is an enlarged detailed view taken in section on the line 11—11 of FIG. 12.
FIG. 12 is a detailed view taken in section on the line 12—12 of FIG. 11.

The switch is closed by depressing the free end portion 156 of the spring arm 155 to engage contact button 157 with contact button 158. To depress the spring arm 155 for switch closing purposes, I provide a handle 160 which projects from the switch casing 151, as best shown in FIG. 12, and which is supported by spring arms 161 and 162, the common intermediate portion 163 of which is bolted to the switch casing at 164. A stop flange 165 on the wall of the casing 151 arrests the downward movement of the handle 160 when switch arm 155 is moved to switch closing position. The bias of the spring arms 161 and 162 is exerted upwardly on handle 160 so that the handle will normally be lifted from the stop flange 165 unless held in switch closing position by a thermostatic detent which comprises a bimetallic thermostat 166 within the combustion chamber 30, as shown in FIG. 11, and from which an arm 167 projects outwardly through aperture 168 in the combustion chamber and through aperture 169 in the cabinet or housing. The switch casing 151 is carried by the cabinet immediately outside of aperture 169 so that the free end of the arm 167 extends into the switch casing 151. In certain positions of the bimetallic thermostat, the arm may project through the cabinet and out the aperture 170 provided in its outer wall, as shown in FIG. 11.

Adjustment of the bimetallic thermostat to control the range of movement of the arm 167 is provided by mounting its anchored end upon a pivot block 171 held to the combustion chamber wall by screws 172 and 173, respectively, located at opposite sides of its fulcrum 174. The bimetallic element is so organized that when heated it will flex its upper end to the left, as viewed in FIG. 11, and when cold its free end will flex to the right. FIG. 11 shows the position of the free end of the thermostat which is appropriate when the space heater is in normal operation.

Figure 13:
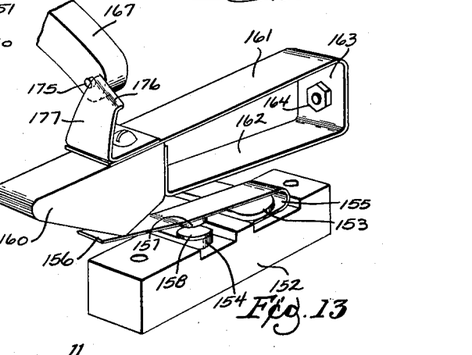
FIG. 13 is a further enlarged detailed view in perspective of the thermostatic control parts shown in FIGS. 11 and 12.
Figure 14:
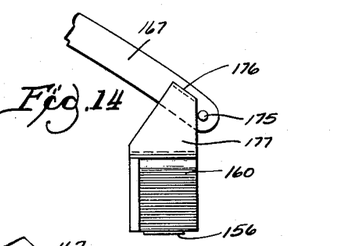
FIG. 14 is a view of the interlocking thermostat and detent parts in a different position from that shown in FIG. 13.

In this position of the parts, the pin 175 carried near the free end of the thermostatic arm 167 is engaged with the top flange 176 of a finger 177 which extends upwardly from handle 160 within the switch casing 151. The flange is so inclined as to be substantially tangential to the arc of movement of pin 175 as the thermostatic element flexes in response to temperature change. In the event that the device overheats, the movement of the free end of the thermostatic element to the left, as viewed in FIG. 11, will cause the pin 175 to disengage itself from flange 176 at the left hand side of finger 177, as shown in FIG. 13, thus permitting the switch to spring open. If the temperature in the combustion chamber falls below the level of proper combustion, the resulting movement of the free end of the thermostatic element to the right, as viewed in FIG. 11 and FIG. 14, will cause pin 175 to clear finger 177 to the right, whereupon the handle 160 will spring upwardly to the position shown in FIG. 14, thus opening the switch. Specifically, the structure need only be such that the detent and switch actuator have parts which engage only when the device is operating in the proper temperature range.

It will be evident from the foregoing that a single thermostatically controlled safety device has been provided in which the detent permits the switch to open whenever the temperatures in the combustion chamber deviate from the predetermined range either upwardly or downwardly. Thus, whether the device overheats for any reason, or whether the fire goes out, because of power or fuel failure or otherwise, in any event the motor is cut off and must be re-set before operation can be resumed. Whether the supply of fuel is higher or lower than the point of discharge into the heater, and whether the fuel is liquid or gaseous, there is no condition under which fuel can flow unless the motor is in operation, since the displacement pump is not merely a pump but a metering device which regulates flow.

In the embodiment of the invention which is preferred for certain usage, the pump may be duplex as shown, the upper block 94 of the pump casing having a second recess at 180 analogous to the recess 96 of the fuel pump and similarly connected by a duct 181 (FIG. 18) with the cylinder 114 so that alternating pressure and vacuum within the cylinder is communicated to recess 180 to effect diaphragm movement therein to the extent permitted by the adjustable plug and stop at 182 (FIG. 15). This provides auxiliary pumping action.

The valving arrangement is similar to that already described, but it may be unnecessary to use more than one valve ring at 183, having an inwardly projecting valve tab at 184 covering inlet port 185 and an upwardly formed and oppositely disposed tab at 186 covering the outlet port 187. As in the case of the fuel pump, the purpose of this tab is to support the diaphragm over the outlet port so that all of the displaced fluid can pass therethrough. Without this upwardly formed tab, there is a tendency for the diaphragm to seat over the outlet port and to trap fluid within the pump chamber. As in the case of the fuel pump, the outlet port is controlled by a ball check valve 188 supported by compression spring 189. Inlet duct 190 leads to inlet port 185 and outlet duct 191 opens from the outlet port 187 below the valve.

The auxiliary pump may be used for a variety of purposes, one of which is exemplified in FIGS. 22 and 23. In these views, the pipe 193 leads from the auxiliary pump outlet duct 191 to a heat pickup coil 194 disposed in the flue pipe 59. Although the heat exchange provided in the apparatus is remarkably efficient and the flue gas temperatures at the point of discharge may be below 250° F., it is still possible to salvage heat for the reason that the gases are positively expelled through the flue and do not require heat for gravity flow.

The output of coil 194 connects to an expansion tank 195 from which pipe 196 leads to any desired radiator or system of radiators in which the heat may be used. For example, a heating coil 197 may be disposed within the annular fuel screen 198 supported by cage 199 in the fuel supply tank 200 from which fuel pipe 130 leads to the pump which supplies the space heater. As shown, the pipe 130 may take fuel from the center of heating coil 197 so that, if the apparatus is used in extremely cold climates, any tendency of the fuel to become congealed in tank 200 will be overcome by supplying to the fuel the first heat derived from the flue 59. While it is broadly immaterial what liquid is circulated in the system presently being described, I have found it convenient to use various alcohols, including those commonly used in automobile radiators for anti-freeze purposes.

From the coil 197, the pipe 201 leads to another coil 202 which serves to radiate off most of the heat remaining in the circulating liquid of this auxiliary system. If the coil 202 is located in the back of the cabinet, where it is in the path of the air admitted through ports 48 (FIG. 23), it will give off heat to this air, which, after passing through the cabinet, and picking up additional heat is aspirated into the space to be heated in the manner above described. After substantially all super-atmospheric heat has been removed from the circulating liquid, the liquid is returned through pipe 203 to the inlet duct 190 of the auxiliary pump for re-circulation through the flue, it being desirable for the protection of the diaphragm that the pump should operate on the circulating liquid only after it has been cooled.

In order that the temperature of the radiation coil 197 in the fuel tank may be controlled, I prefer to use at 211 a by-pass between pipes 196 and 201, the by-pass being controlled by any type of valve at 212. The opening and closing of the valve will bleed any desired proportion of the flow directly into pipe 201 and radiator 202, leaving for traverse of radiator 197 only such portion of the heating liquid as may be needed to heat the fuel to the requisite degree.

The operation of the device is as follows:

The first step is to introduce fuel into the starting reservoir 142. If the supply of fuel in the tank 200 is congealed, it may be necessary to introduce fluid fuel through the trap door 145 of the starting reservoir 142. In extremely cold climates, even gasoline may congeal but, since the device will operate interchangeably on any fuel, it may frequently be possible that the tank 200 may contain heavy fuel oil which will not be fluid, even in climates which are only moderately cold. In that case, gasoline might be poured through the door 145 into the reservoir 142 for starting. The burning of the fuel in the starting reservoir 142 will warm up the entire apparatus, including the combustion chamber and the flue. Accordingly, even if the fuel in the tank is not fluid to start with, it will be possible to start the motor 82 in operation by manually holding down the handle 160 to close the switch. This will pump the non-freezing liquid through the auxiliary circulatory system to deliver heat from the flue to the fuel in the tank so that the fuel will become fluid and can be pumped through the nozzle or delivery pipe 68 into the fuel trough 65, where it will be ignited by the flames from the fuel burning in the starting reservoir 142.

Assuming that the fuel in the tank is fluid, the starting reservoir 142 will be filled by manually opening valve 136 so that some of the fuel pumped is discharged into reservoir 142, the pump being continued in operation by manually holding down the switch handle 160.

In either case, the switch handle must be held down manually until the temperature in the combustion chamber reaches the operating range as determined by the setting of the thermostat and the extent of the detent flange 176. As soon as the operating range is reached, the thermostatically controlled pin 175 will move over the detent flange 176 and will hold the switch closed to maintain the motor in operation as long as the operating range of temperatures is maintained.

Operation of the motor 82 not only actuates the pump but also actuates the rotor shaft 35 which, as above described, rotates the vanes 40 to circulate room air into and out of the bowl shaped heat exchange partition 26, the vanes 57 within the combustion chamber which expel the flue gas, and the trough 65 into which the fuel is delivered by pipe 68.

The fuel delivered into trough 65 is thrown centrifugally over the flange 67 directly into the path of the air required to support combustion, which air is admitted through the ports 32 in the periphery of the combustion chamber 30. The air and the burning fuel moves arcuately around the surface of the refractory lining 31 on the semi-toroidal fire pot portion 30 of the combustion chamber. Radiation from the refractory lining is focused on the heat exchange partition 26 and is an important factor in the extremely high efficiency of operation of the device, since the heating of the partition 26 by such radiation is independent of convection of heat by the flue gases.

Additional efficiency is the result of the scouring action of the flue gases moving at high velocity across the convex face of the heat exchange partition 26 while the air to be heated is moved at equally high velocity over the concave face.

In addition to the heat directly imparted to the room air by contact with the heat exchange partition 26, a very considerable amount of additional heat is imparted to room air by a circulation through the cabinet and over the exterior surfaces of the combustion chamber and other heated parts, such air being aspirated between the flange 29 of the bowl shaped partition 26 and the flange 46 which surrounds it.

A very important feature having to do with economy of manufacture of the device is the minimum amount of machining required. Most of the parts are simple stampings which do not require to be machined. I do, preferably, employ an inwardly turned flange 205 (FIG. 5) on the generally cylindrical combustion chamber wall 28, such flange being directly opposite the flange 66 at the outer perimeter of the fuel trough wall 64. These flanges 66 and 205 are desirably machined to a clearance of the general order of one sixty-fourth of an inch, this being the one point at which running clearance is involved where the flue gases are under super-atmospheric pressure. Where the sleeve shaft 38 passes through the opening 206 in the bowl shaped heat exchange partition, and where it passes through the opening 207 at the center of the semi-toroidal wall 30 of the combustion chamber, the gases within the combustion chamber are under sub-atmospheric pressure as a result of the blower action of the vanes 57. Hence any leakage through the openings 206 or 207 will tend to be a leakage of air into the combustion chamber rather than a leakage of flue gas from such chamber.

However, the clearance provided between the stationary flange 205 and the rotating fuel trough flange 66 will be observed to be in the interior of the combustion chamber. Hence, any high pressure flue gas leakage occurring at this point does not escape into the air of the room to be heated but is returned to the low pressure zone of the combustion chamber.

Meantime, cooling air admitted through the ports 39 to the interior of the sleeve shaft 38 and passing therefrom through ports 56 to the hollow tubular arms 55 is expelled through the openings 208 at the ends of such arms. All the air required for combustion may be supplied in this manner, the ports 32 in the periphery of the combustion chamber being dispensed with and the chamber periphery desirably closed to the flue. Whether or not all combustion air traverses the arms, there is desirably sufficient flow to keep the arms from becoming overheated despite the fact that they are operating in the combustion chamber in the presence of gases which are burning at high temperatures.

As above indicated, the device is extremely efficient in operation and removes from the flue gases a very large percentage of their super-atmospheric heat before discharging them through the flue.

Figure 24:
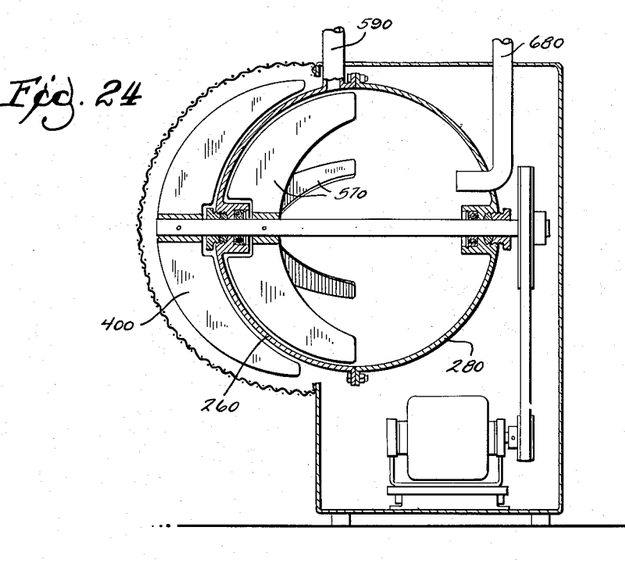
FIG. 24 is a view similar to FIG. 5 showing a modified embodiment.

FIG. 24 shows, merely by way of exemplification, a diagrammatic illustration of a modified embodiment in which the chamber 280, instead of comprising a combustion chamber, is a refrigerated chamber. By way of exemplification, this is shown to be spherical, the heat exchange wall 260 being one hemispherical side of the chamber. Refrigerant supplied through pipe 680 cools the heat exchange wall 260, being circulated over the internal surface of such wall by the vanes 570, while room air to be cooled is circulated externally over the heat exchange wall 260 by the vanes 400. The refrigerant vapor returns from chamber 280 through discharge pipe 590. This embodiment is included by way of illustrating the fact that the heat exchange may involve cooling as well as heating. It further exemplifies a way of taking advantage of the strength inherent in a spherical wall to withstand pressure and vibration, these being advantages in addition to the advantages of such a wall in conjunction with internal and external vanes as herein disclosed. This view further suggests the possibility that the surface of the wall which is external to the chamber may be convex instead of concave, the vanes 400 being protected from personal contact by a protecting screen or grating 220.

Figure 25:
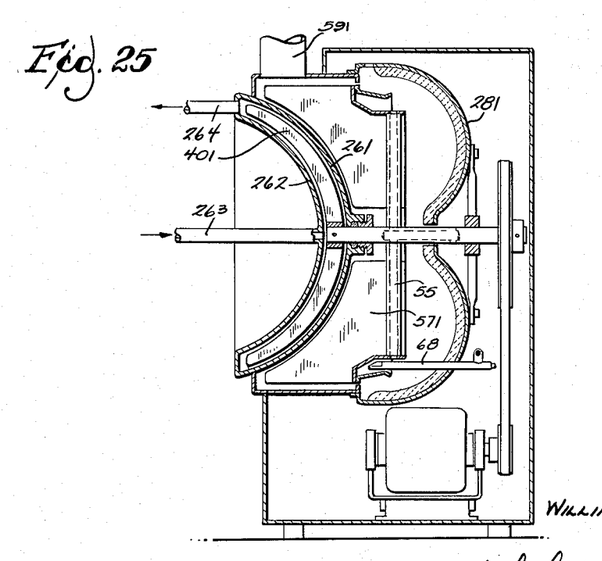
FIG. 25 is a view similar to FIG. 5 showing another modified embodiment.

FIG. 25, also diagrammatic, shows that the fluid on one or the other side of the bowl shaped or spherical heat exchange wall 261 may be a liquid. In this view there is a second annular wall at 262 into which liquid is admitted at 263 to be propelled radially between the walls by the vanes 401. At the periphery, the liquid is discharged through pipe 264 under pressure supplied by the vanes.

Internally of the chamber 281, the heat exchange wall 261 may be either heated or cooled, as shown in FIGS. 5 and 24. The specific construction illustrated in FIG. 25 is that of a combustion chamber at 281 comparable to the combustion chamber shown in FIG. 5, the fluids circulated by the vanes 571 being products of combustion en route to the flue 591.

Figure 26:
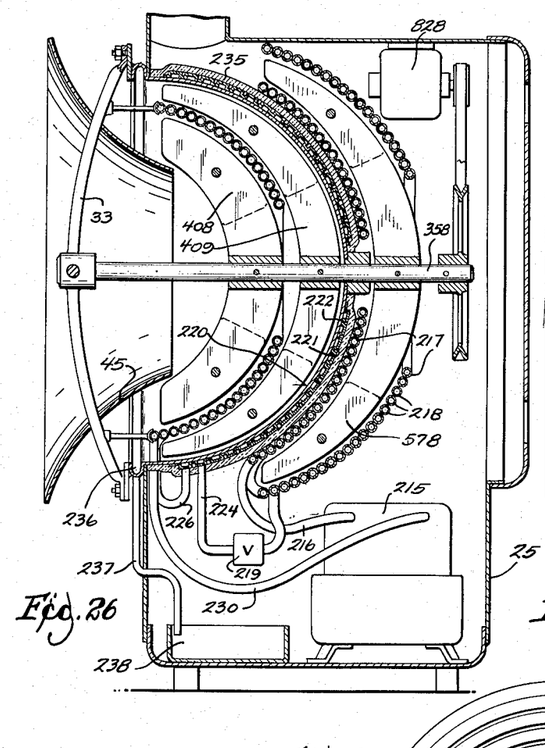
FIG. 26 is a view similar to FIG. 5 showing a cooling embodiment interchangeable in the same housing with the heater there illustrated.

The room cooler device shown in FIG. 26 is adapted for use in the same cabinet 25 as that which houses the space heater in FIG. 5. In this device, the unitary hermetically sealed motor-compressor unit 215 has its refrigerant output pipe 216 connected to a radiator 217 which comprises helically wound coils 218 on both sides of the fan blades or vanes 578 mounted on shaft 358. Since the motor-compressor 215 is a hermetically sealed unit, and since the amount of power required to rotate shaft 358 is relatively small, a separate motor 828, desirably wired in parallel with motor 215, is used to drive the shaft.

Figures 28, 29:
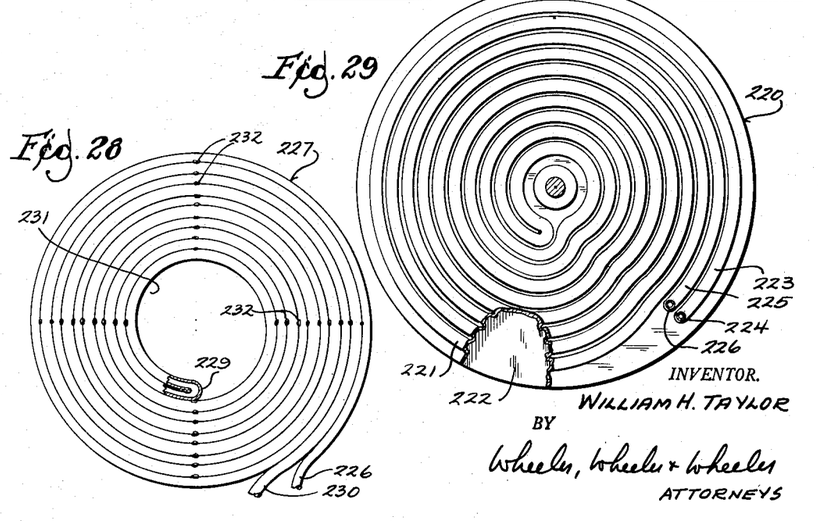
FIG. 28 is a detailed view in elevation of a heat exchange partition used in the devices of FIG. 26 and FIG. 27, portions being broken away.
FIG. 29 is a detailed view in elevation of one wall of a heat exchange partition used in the devices of FIGS. 26 and 27, portions being broken away.

The refrigerant condensed in coil 217 passes through any desired pressure reducing device such as the valve 219, en route to an evaporator coil at 220. This coil may comprise helically wound tubing like that used at 218 in the condenser 217. By way of exemplifying an alternative arrangement, I have disclosed a coil made of inner and outer sheets of metal 221 and 222 respectively, at least one of which is provided with spiral convolutions as shown in FIGS. 26 and 29 in the metal sheet 221. The two sheets have a bowl shaped contour which is preferably hemispherical, for reasons pointed out above. Together they provide a spiral passage 223 leading from the inlet pipe 224 to a point adjacent the center of the coil and another spiral passage 225 leading outwardly from passage 223 to the outlet pipe 226.

The heat exchange partition, as here disclosed, comprises a heat rejecting coil 217 on the inner surface, the heat absorption coil or evaporator 220 on the outer surface and an intervening layer of insulation at 235. Merely by way of exemplification, the metal ply 222 is used to support the entire assembly and to it is connected the spider 33 which carries the bearing for shaft 358 and which also carries the baffle 45. Since the metal ply 222 is here used as part of an evaporator, condensation will form upon it, and I desirably provide its periphery with an annular channel at 236 in which condensate will be forced by the whirling movement of the air discharged across the evaporator. From the lowest portion of the channel 236 a drain pipe 237 leads to a tray 238.

Refrigerant issuing from this section of the evaporator through pipe 226 and not yet fully evaporated, along with that portion which has been evaporated, must traverse a second evaporator section 227, likewise bowl shaped, this one being formed, by way of exemplification, by folding a piece of tubing upon itself at 229 as shown in FIG. 28 and then winding the duplex tube into spiral and dished form as illustrated in FIGS. 26 and 28. The refrigerant pipe 230 leads from the delivery end of the evaporator section 227 back to the motor-compressor unit.

Figure 27:
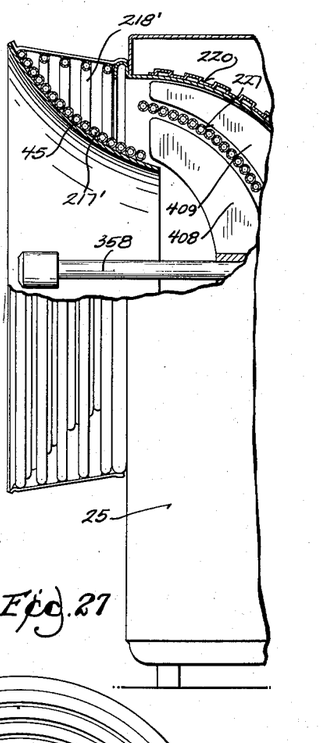
FIG. 27 is a fragmentary detailed view similar to FIG. 26 showing a modification thereof used for dehumidification rather than room cooling.

It will be understood that the respective sections of the evaporator may be made either as shown in FIG. 26 or as shown in FIG. 29 but, in either event, they are desirably bowl shaped. The fan blades 408 and 409 respectively operate within the concavity of evaporator section 227 and on the convex side of such section, the blades 409 being between evaporator sections 220 and 227. Evaporator section 227 has a relatively large central opening at 231 through which air guided into the device by means of the bell-shaped baffle 45 reaches the areas serviced by blades 408 and 409. Since the coils comprising evaporator section 27 are tacked together only at intervals, as indicated at 232 in FIG. 28, any condensate accumulating on these coils will be expelled through them by the air and picked up by the channel 236 above described.

Where the device is intended for de-humidification rather than mere room cooling, the condenser 217' may be located in the path of the refrigerated air leaving the evaporator sections 220 and 227 as suggested in FIG. 27. Here the condenser 217' lies on the concave face of baffle 45, while condenser section 218' comprises spaced coils between which the air must pass before issuing to the room.

I claim:

1. In a device of the character described, the combination with a combustion chamber having a heat exchange wall and an annular reflecting wall of concave form opposed to the heat exchange wall for directing radiant energy thereupon, and a rotor centrally disposed and rotatable with reference to the heat exchange wall and provided externally of the combustion chamber with vanes having free margins in immediate proximity to said heat exchange wall and movable across said wall for the propulsion in scouring heat receiving relation to said wall of fluid to be heated thereby and means for introducing fuel and oxygen into the combustion chamber and directing the products of combustion against said heat reflecting wall.

2. The device of claim 1 in which said rotor is mounted to extend through the heat exchange wall and is additionally provided with vanes operating in immediate proximity to said wall within the combustion chamber for the scouring propulsion of products of combustion across the heat exchange wall, said combustion chamber having an outlet flue for products of combustion propelled across the heat exchange wall, and means for actuating said rotor.

3. The device of claim 2 in which the means for directing products of combustion upon the reflecting wall comprises an annular trough mounted upon the shaft for rotation therewith and disposed externally of said vanes and opening toward the reflecting wall, the fuel supplying means comprising a conduit opening into said trough for the delivery of fuel thereto.

4. A space heater comprising, in combination, a rotatably mounted shaft and means for the rotation thereof, an annular combustion chamber substantially co-axial with the shaft and comprising axially spaced walls, one of which comprises a bowl shaped heat exchange wall having a convex surface within the chamber and a concave surface outside of it, an annular wall connecting the axially spaced walls aforesaid, angularly spaced vanes disposed within the combustion chamber and mounted on the shaft for rotation therewith, said vanes having free edges extending about the convex surface of the heat exchange wall and in immediate proximity to said wall, whereby said vanes are adapted for propelling products of combustion thereover, means for introducing fuel and oxygen into the combustion chamber, a flue opening from a peripheral portion of said chamber for venting products of combustion therefrom, and vane means carried by said shaft and having free margins in close proximity to the concave surface of the bowl shaped wall for propelling across said wall a fluid to be heated.

5. In a heat exchange device, the combination with a rotatably mounted shaft and means for the rotation thereof, of an annular chamber, one wall of which is bowl shaped having concave and convex surfaces substantially co-axial with said shaft and through which said shaft extends, said shaft being provided with sets of vanes on each side of the wall, the vanes of one set having concave margins complementary to the convex face of the wall and the vanes at the other sides thereof having convex margins complementary to the concave, the margins of the vanes of both sets being in open and immediate proximity to the wall to propel fluids across its respective convex and concave faces.

6. The device of claim 5 in which said chamber comprises a combustion chamber having means for admitting fuel and oxygen thereto and flue means for venting products of combustion therefrom, said flue means opening from a point adjacent the periphery of said wall, the products of combustion being the fluids propelled by the vanes of one of said sets and the flue means being adapted to receive such products of combustion under pressure developed by said last mentioned vanes.

7. The device of claim 5 in which the convex face of the wall is exposed at the interior of said chamber.

8. The device of claim 5 in which one surface of said wall is exposed to the atmosphere and the vanes adjacent such surface propel atmospheric air across said surface for heat exchange therewith.

9. The device of claim 8 in which the said surface of the wall external to said chamber is concave, and in further combination with a bell shaped baffle substantially co-axial with said shaft for guiding atmospheric air centrally to said wall, said baffle being spaced from said wall for peripheral discharge of air set in motion by the vanes cooperating with the concave wall surface.

10. In a space heater, the combination of an annular combustion chamber having a bowl shaped heat exchange wall, a shaft extending through said wall, means for the rotation of said shaft, vanes carried by the shaft and rotatable respecting the wall and having free margins disposed immediately adjacent the wall and having intervane spaces opening to the wall both within the chamber and externally thereof for propelling fluids over said wall, a casing surrounding the chamber and enclosing a space outside of said chamber and constituting an annular air flow passage opening toward the side of said wall externally of said chamber whereby air displaced by the external vanes will aspirate air through said passage.

11. A space heater comprising the combination with an annular combustion chamber having a bowl shaped heat exchange wall with a spherically convex face exposed to the interior of the chamber and a concave face exposed outwardly thereof, said chamber including a heat reflecting wall spaced from the heat exchange wall and having a concave face directed toward the heat exchange wall, a shaft substantially co-axial with said walls and extending therethrough, vanes carried by the shaft and respectively disposed within the chamber and externally thereof and immediately adjacent the heat exchange wall, said vanes having concave and convex margins respectively complementary to the convex and concave faces of the heat exchange wall, inter-vane spaces being open to said wall, means for supplying fuel and oxygen to the chamber for combustion therein and means for venting from the chamber products of combustion passed over said wall by the first mentioned vanes.

12. The device of claim 11 in further combination with an annular trough mounted on said vanes to rotate with said shaft and opening toward the heat reflecting wall, the fuel supplying means comprising a pipe extending into said chamber and having a discharge opening directed into said trough.

13. The device of claim 12 in which the shaft is tubular and provided with air admission means, said shaft having tubular radial supports mounting upon it the vanes disposed within the chamber, said tubular supports communicating with said shaft to receive cooling air therethrough and having opens radially remote from said shaft for discharging such air in said chamber.

14. In a space heater, the combination with a combustion chamber and a rotatably mounted burner, of a shaft supporting the burner, means for driving the shaft, and a displacement type pumping and metering device having a fuel supply connection and a discharge connection leading to said burner, said device including an actuator in operative connection with the shaft whereby to ensure synchronous operation of the actuator and burner, said burner comprising an annular trough concentric with the shaft and opening axially thereof, said chamber being annular and surrounding the shaft and provided with a heat exchange wall through which the shaft extends, the shaft having fluid propelling vanes internally and externally of the chamber in immediate proximity to said wall, the said pumping and metering device having a discharge pipe opening into said trough.

15. In a space heater, the combination with a combustion chamber having a generally circular peripheral wall, a bowl shaped end wall constituting a heat exchange partition and an annularly channeled reflecting end wall having a radially concave reflecting surface directed at said heat exchange partition and having a refractory lining on such surface, a shaft extending substantially axially through said heat exchange partition, vanes mounted on said shaft both internally of said chamber and externally of the heat exchange partition and marginally complementary thereto for rotation in immediate proximity to said partition, a flue opening from said combustion chamber adjacent the periphery of said partition, said combustion chamber having air inlets, an annular trough disposed within the chamber and mounted for rotation with said shaft, said trough opening toward said reflecting wall and being disposed near said inlets, a fuel delivery pipe having its discharge end arranged for delivery of fuel into said trough during the rotation thereof with said shaft, and means for simultaneously delivering fuel to said pipe and rotating said shaft.

16. The device of claim 15 in further combination with a housing enclosing said chamber and having air inlet ports for admitting air to pass through said housing to the inlets of said chamber, said housing further being provided with air outlet means about the periphery of said partition whereby air discharged over said partition by the vanes external thereto aspirate air through and from said housing for the cooling of external surfaces of said chamber.

17. The device of claim 15, said partition and portions of said chamber externally thereof having complementary flaring margins between which said chamber is provided with air discharge port means, said margins together constituting means for the aspiration of air from said chamber.

18. The device of claim 15 in which said bowl shaped heat exchange partition is externally concave, in further combination with a frusto-conical annular baffle having a smaller end extending into the concavity of said partition intermediate said shaft and the partition periphery whereby to guide room air into said partition to receive heat therefrom and to be propelled outwardly between the partition and baffle by the vanes external to said partition.

19. The device of claim 18 in which said partition has a flaring margin and said chamber is provided with a flaring flange spaced outwardly from a partition margin, the chamber having outlet port means between the partition margin and said flange, and the flange and partition margin together constituting an aspirating nozzle whereby air passing from the partition margin aspirates air from said chamber.

20. The device of claim 15 in which said shaft is tubular and is provided with tubular arms internally of the combustion chamber upon which said internal vanes and trough are mounted, said tubular shaft having an external air inlet and said arms having air outlets remote from the shaft whereby air currents are centrifugally established during shaft rotation of the cooling of said arms.

21. The device of claim 15 in further combination with a starting receptacle opening into said combustion chamber and having means for the introduction of fuel and for the ignition of fuel therein, whereby the fuel so ignited will heat said chamber and ignite fuel delivered to said trough.

22. The device of claim 21 in which the means for introducing fuel to the starting chamber comprises a branch line with manually controllable valve from said fuel supply pipe and the means for ignition comprises a door through which the interior of said chamber is accessible for ignition.

23. The device of claim 15 in which the means for supplying fuel comprises a displacement and metering pump having a pitman mounted upon a crank with which said shaft is provided.

24. The device of claim 23 in which said pump comprises a diaphragm pump with pitman actuated means for its fluid operation, said means comprising a displacement chamber and a displacement member therein connected with said pitman and independent of said diaphragm, said pump having means for varying its capacity, said means including a stop adjustable in the path of pumping movement of the diaphragm for limiting the displacement thereof.

25. In a space heater, the combination with a combustion chamber, of means for delivering fuel therethrough comprising a pipe, a metering and displacement pump connected with the pipe, and a flow regulating device in the pipe comprising a screw and means for the rotation thereof, the pump having an actuating pitman provided at one end with a displacement member and at the other end with a crank, said pitman and screw having driving and driven elements mutually engageable in one direction of pitman reciprocation for the rotation of the screw and free of engagement in the opposite direction of pitman reciprocation on account of pitman displacement laterally by said crank.

26. The device of claim 25 in which said driven element comprises a pulley connected with the screw and said driving element comprises a piece of belting having its intermediate portion engageable with the pulley in one direction of pitman reciprocation, said pitman having means supporting the ends of said belting.

27. A mechanical movement comprising the combination with a crank and a pitman having a bearing on the crank and having a bearing remote from the crank in which the pitman is reciprocable, the pitman thereby being orbitally movable, of a shaft disposed beside the pitman, means for transmitting motion from said pitman for the intermittent rotation of said shaft, said means comprising a piece of belting mounted at its ends on the pitman and having its intermediate portion free at the side of the orbitally movable pitman, the shaft having a pulley with which said belting engages in one direction of pitman reciprocation and from which it is disengaged in the opposite direction of pitman reciprocation because of its orbital movement on the pitman.

28. A diaphragm pump comprising the combination with a casing element having inlet and outlet ports and means for holding to said casing element a diaphragm covering said ports and means for diaphragm reciprocation, of a check valve controlling the outlet port and an inlet valve comprising an annulus disposed beneath the diaphragm nad having an inwardly projecting tab constituting a leaf valve over the inlet port, a second annulus overlying the annulus first mentioned and having a tab overlying the tab first mentioned, the first mentioned tab being relatively flexible and the second tab being less flexible than the first tab.

29. The device of claim 28 in which said second annulus has another inwardly projecting tab arched over the outlet port to preclude the diaphragm from prematurely seating thereupon.

30. In a diaphragm pump, the combination with a diaphragm and a casing element having a surface to and from which said diaphragm is movable and in which said casing element provides inlet and outlet ports, means for diaphragm operation, and means spanning the said ports for controlling the outlet port for preventing the diaphragm from seating prematurely thereover to trap fluid in the pump, the means spanning the outlet port comprising an arched tab having a supporting ring encircling both of said ports and disposed between the diaphragm and the casing element aforesaid.

31. The device of claim 30 in which said ring has another tab overlying the inlet port.

32. The device of claim 31 in further combination with a second casing element overlying the diaphragm and clamping it to the casing element first mentioned, the second casing element having a central opening above the diaphragm and from which radial channels extend above said tabs.

33. The device of claim 32 in which a plug is axially adjustable in the central opening into adjustable engagement with the diaphragm for limiting displacement thereof.

34. The combination with a fuel tank, a fuel burner and a heat exchange system, of a pump comprising the combination with a pair of casing elements having a gasket and diaphragm clamped between them, a displacement chamber disposed centrally of one of said elements, the last mentioned element having other displacement chambers offset laterally from the displacement chamber first mentioned and communicating therewith, a displacement member in the chamber first mentioned having means for its reciprocation whereby to subject the diaphragm periodically to pressure and vacuum in the laterally offset chambers, the other of said elements being provided with separate inlet and outlet ducts opening to the diaphragm beneath each of said laterally offset chambers and provided with inlet and outlet check valves whereby the actuation of said displacement member results in separate pumping operations of the diaphragm in the said laterally offset chamber, the inlet and outlet ducts beneath one of said laterally offset chambers being respectively connected with said fuel tank and said burner, the inlet and outlet ducts beneath the other laterally offset chamber being respectively connected into said circulatory heat exchange system said system including one heat exchange conduit exposed to the heat of the burner and another heat exchange conduit exposed to fuel in the tank.

35. The combination with a burner and combustion chamber and fuel tank, of a duplex pump and means for its actuation, said pump comprising one pump device having an inlet connected with the fuel tank and an outlet connected with the burner and a second pump device connected for operation with the first pump device and having an inlet and outlet in further combination with a circulatory heat exchange system including a continuous duct having one portion in the path of products of combustion and another portion in said tank whereby heat developed by said burner is delivered to said tank for maintaining fluidity of fuel therein.

36. The device of claim 35 in which a flue opens into said combustion chamber, the first mentioned portion of said duct being disposed in said flue.

37. The device of claim 36 in which the second mentioned portion of said duct comprises a coil in said tank, an inlet pipe leading to the inlet of the first pumping device being disposed within the coil to open centrally therefrom.

38. In a heat exchange device, a partition of bowl shaped form having interior and exterior heat exchange surfaces at the concave and convex faces of the partition respectively, a shaft penetrating the partition, and vanes which are respectively marginally concave and convex mounted on the shaft and having generally radial free margins which respectively conform substantially to the concave and convex faces of the partition at respectively substantially uniform spacing therefrom, and are disposed to rotate in immediate scouring proximity and with respect to the convex and concave surfaces of the partition, and means for rotating the vanes and shaft respecting the partition, the edges of the vanes being in immediate proximity to the partition substantially throughout the extent of said heat exchange surfaces.

39. The device of claim 38 in which said partition comprises an intermediate core of insulation, one of said surfaces comprising a jacket having connections for a fluid at sub-atmospheric temperature and the other comprising a jacket having connections for fluid at super-atmospheric temperature.

40. The device of claim 38 in further combination with a refrigeration circuit including a compressor, one of said surfaces comprises a condenser and the other an evaporator in series connection in said circuit, said partition comprising thermal insulation between the condenser and the evaporator.

41. The combination with a shaft and a set of three vanes mounted thereon, all of which have base portions connected with the shaft and terminal portions extending outwardly and to positions offset axially of the shaft from their base portions, of at least two sets of jacket type heat exchange partitions of bowl shaped form intervening between the several vanes and to which the margins of the vanes closely conform.

42. The device of claim 41 in which one of said partitions comprises dual tubular convolutions connected to each other adjacent the shaft and extending spirally about the shaft to provided inlet and outlet connections remote from the shaft.

43. The device of claim 41 in which at least one of said partitions comprises a pair of plates having mutually offset portions providing parallel channels of generally spiral form joined adjacent the shaft and provided with terminal connections remote therefrom.

44. A room cooler comprising co-axial bowl shaped evaporator and condenser means, a refrigeration circuit including said means, a shaft extending through one of said means, vanes having marginal surfaces complementary to said means and mounted on said shaft for effecting air movement across said means, a cabinet enclosing the condenser means and having an inlet and an outlet whereby air heated thereby is confined to flow through said outlet, the evaporator means being open for the passage of room air thereover.

45. A de-humidifier comprising a bowl shaped evaporator, a shaft passing therethrough, and provided with vanes marginally complementary to the evaporator to rotate in immediate proximity to opposing faces thereof, a condenser having heat rejecting surfaces of annular form surrounding said evaporator in the path of air ejected by said vanes after traversing the evaporator, and a refrigeration circuit in which the condenser and evaporator are connected in series.

References Cited in the file of this patent
UNITED STATES PATENTS

| Number | Name | Date |
|---|---|---|
| 192,072 | Jamieson | June 19, 1877 |
| 373,030 | Steel | Nov. 8, 1888 |
| 722,530 | McDermott | Mar. 10, 1903 |
| 871,541 | Wallace | Nov. 19, 1907 |
| 999,175 | Mehl | July 25, 1911 |
| 1,029,766 | Ramsay | June 18, 1912 |
| 1,094,078 | Lovekin | Apr. 21, 1914 |
| 1,188,381 | Allen | June 27, 1916 |
| 1,189,026 | Williams | June 27, 1916 |
| 1,587,263 | Willners | June 1, 1926 |
| 1,594,020 | Smith | July 27, 1926 |
| 1,858,536 | Carter | May 17, 1932 |
| 1,982,139 | Keicher | Nov. 27, 1934 |
| 1,991,235 | True et al. | Feb. 12, 1935 |
| 2,087,240 | Brown | July 20, 1937 |
| 2,104,813 | Pieper | Jan. 11, 1938 |
| 2,152,614 | Younger | Mar. 28, 1939 |
| 2,156,628 | Hintze | May 2, 1939 |
| 2,206,241 | Swallow | July 2, 1940 |
| 2,209,099 | Grueneklee | July 23, 1940 |
| 2,296,067 | Smith | Sept. 15, 1942 |
| 2,304,489 | Wetzel | Dec. 8, 1942 |
| 2,332,969 | Higley | Oct. 26, 1943 |
| 2,384,251 | Hill | Sept. 4, 1945 |
| 2,388,855 | Leslie | Nov. 13, 1945 |
| 2,397,986 | Senninger | Apr. 9, 1946 |
| 2,413,100 | Crise | Dec. 24, 1946 |
| 2,416,932 | Litzenberg | Mar. 4, 1947 |
| 2,453,913 | Higley | Nov. 16, 1948 |
| 2,474,687 | Parrish | June 28, 1949 |
| 2,491,230 | Theis | Dec. 13, 1949 |
| 2,494,714 | Lyman | Jan. 17, 1950 |
| 2,496,688 | Armstrong | Feb. 7, 1950 |
| 2,519,496 | Norman | Aug. 22, 1950 |
| 2,524,608 | Stauffer | Oct. 3, 1950 |
| 2,535,775 | Ashley | Dec. 26, 1950 |
| 2,546,302 | Gehres et al. | Mar. 27, 1951 |
| 2,566,692 | Chandler | Sept. 4, 1951 |
| 2,598,147 | Tescher | May 27, 1952 |
| 2,643,097 | Bowden et al. | June 23, 1953 |
| 2,680,007 | Arbuckle | June 1, 1954 |
| 2,680,411 | Hein | June 8, 1954 |
| 2,713,827 | Hoop | July 26, 1955 |
| 2,753,804 | Goss | July 10, 1956 |